United States Patent [19]

Breidenstein et al.

[11] Patent Number: 5,239,542

[45] Date of Patent: Aug. 24, 1993

[54] TIME DIVISION MULTIPLEX SWITCHING SYSTEM FOR INTERCONNECTING TELEPHONE CIRCUITS WHICH OPERATE IN ACCORDANCE WITH DIFFERENT SIGNALLING SYSTEMS AND CALL FORMATS

[75] Inventors: Charles J. Breidenstein, Rochester; Jerome S. Caplan, Henrietta; Klaus Gueldenpfennig, Penfield, all of N.Y.

[73] Assignee: Redcom Laboratories, Inc., Victor, N.Y.

[21] Appl. No.: 749,248

[22] Filed: Aug. 23, 1991

[51] Int. Cl.$^5$ .............................................. H04J 3/12
[52] U.S. Cl. ..................................... 370/79; 370/58.2; 370/68.1; 370/85.13; 370/110.1; 379/94; 379/353
[58] Field of Search ...................... 370/85.13, 68.1, 68, 370/60, 58.2, 110.1, 79; 379/90, 94, 120, 353

[56] References Cited

U.S. PATENT DOCUMENTS

| | | | |
|---|---|---|---|
| 4,228,536 | 10/1980 | Gueldenpfennig et al. | 370/66 |
| 4,677,611 | 6/1987 | Yanosy, Jr. et al. | 370/85.13 X |
| 4,788,657 | 11/1988 | Douglas et al. | 379/90 X |
| 4,852,157 | 7/1989 | Tyrrell | 370/110.1 X |
| 4,972,407 | 11/1990 | Kawai | 370/68 |
| 5,046,067 | 9/1991 | Kimbrough | 370/68 X |
| 5,060,227 | 10/1991 | Finley et al. | 370/79 |

Primary Examiner—Douglas W. Olms
Assistant Examiner—Russell W. Blum
Attorney, Agent, or Firm—M. Lukacher

[57] ABSTRACT

A time division multiplex switching system converts call formats and signalling protocols so that calls can be interchanged between circuits originating in different networks thereby providing a gateway for telephone transmissions originating from sources (e.g., foreign countries) having differences in transmission (signal attenuation characteristics and companding laws) and signalling and numbering plans or protocols. This switching system is characterized by a processor which is programmed to identify the circuits requiring interconnection and to process signalling messages in accordance with the signalling systems and formats used in the circuits, while translating the signalling messages into common, protocol independent signaling messages which are used for establishing time division multiplex connections in a time slot interchange which is connected to the circuits via PCM highways and for exchanging signalling information (e.g., as to seizure, detection and release) between the circuits; the signalling messages also containing information for conversion of PCM data messages which are switched in the time slot interchange thereby reconciling differences in transmission, such as the companding law used for PCM encoding and decoding and the attenuation (pad value) of the call data in the circuits. The circuits may, for example, be incoming and outgoing trunks.

6 Claims, 6 Drawing Sheets

TIME DIVISION MULTIPLEX SWITCHING SYSTEM FOR INTERCONNECTING TELEPHONE CIRCUITS WHICH OPERATE IN ACCORDANCE WITH DIFFERENT SIGNALLING SYSTEMS AND CALL FORMATS

The present invention relates to time division multiplex (TDM) switching systems for handling communications between circuits (port circuits which may be lines or trunks or service circuits for tones, ringing, etc.), and particularly to a TDM switching system which provides a gateway between circuits which operate in accordance with different transmission and signalling formats and protocols.

The invention is especially suitable for making tandem or transit connections between trunks which operate in accordance with different, disparate signalling systems and which may transmit calls with different transmission characteristics such as different PCM companding laws ($\mu$-255 law or A-law) by performing companding law conversion and signalling conversion, including numbering plan adaptation. It is a feature of this invention to provide such signalling, numbering plan and transmission conversions within a time division switching system, thereby integrating the switching and conversion functions and preventing interference between such functions and telephone exchange or switching functions.

Different countries often use different signalling systems and formats. They also use disparate PCM encoding and decoding and insertion loss or padding in order to translate calls into PCM data messages representing the calls which are transmitted and received in different time slots so that interconnections can be made by time division multiplexing techniques. The signalling systems used in different countries may involve the use of different numbers of digits and different numbering plans as well as other signalling messages to represent data or voice transmissions.

Heretofore, special interfaces dedicated to trunks from telecommunications networks in foreign countries have been used to translate the signalling messages and the data messages (PCM message data) so that they become compatible with the signalling systems and formats which are used in the telephone network of the receiving country. Differences in signalling systems have been an obstacle, particularly in small nations, such as the Pacific Ocean Islands to receiving international telephone communications.

It is the principal object of the present invention to provide an improved time division switching system for PCM communications which integrates the switching function with the conversion functions necessary to reconcile the differences in transmission, signalling (including number plan), protocols and formats used in different telephone networks thereby providing, at an affordable cost, the facility for small telephone systems such as located on remote islands and in developing countries to be connected to receive international telecommunications service.

It is a more specific object of the present invention to provide an improved time division switching system for PCM data messages which are to be connected to trunks, lines or other circuits operating in accordance with different switching protocols and to provide interconnections therebetween without deterioration or interference with communications between such networks due to the interposition of signalling conversions, companding law conversions and other conversions necessary to reconcile the differences between formats and protocols used in such different circuits.

It is a still further object of the present invention, to provide an improved time division multiplex switching system in which circuits (ports, trunks, lines, etc.) may be interconnected without the need for different signalling messages and formats to route calls and to exchange signalling information between the circuits, such routing and signalling data (call treatment data) being translated into a universal, protocol independent language.

Briefly described, a time division switching system embodying the invention provides communications between circuits which operate with signalling data signals formatted according to different signalling protocols and which are connected to PCM highways over which message data is transmitted. The system uses a time slot interchange connected to the highways which provides time division multiplex connections for the message data. First control means responsive to signalling data signals from the circuits controls the circuits in accordance with the signalling protocol in which the signalling data is handled by these circuits. Second control means translates the signalling data into signalling messages in accordance with the protocol common to the circuits for establishing the time division multiplex connections in the time slot interchange and for transmission of signalling messages between the first control means for use in operating the circuits in accordance with their individual, unique signalling protocols. In this way circuits in different telephone networks using different numbers of digits (or other numbering plans), decadic (dial pulse) or multifrequency (DTMF) signalling protocols (R1, R1 modified, R2 SS5, SS7, CEPT and other signalling protocols) may be interconnected through a common time slot interchange with signalling messages establishing the interconnections in a common language, thereby in a simple and effective manner reconciling differences in the signalling systems and formats and also providing for conversion of the PCM codes in accordance with the companding laws ($\mu$-255 law or A law) or insertion loss (padding) used in the telephone networks, the circuits of which are interconnected.

The foregoing and other objects, features and advantages of the invention as well as a presently preferred embodiment thereof will become more apparent from a reading of the following description in connection with the accompanying drawings in which.

Figure 1:
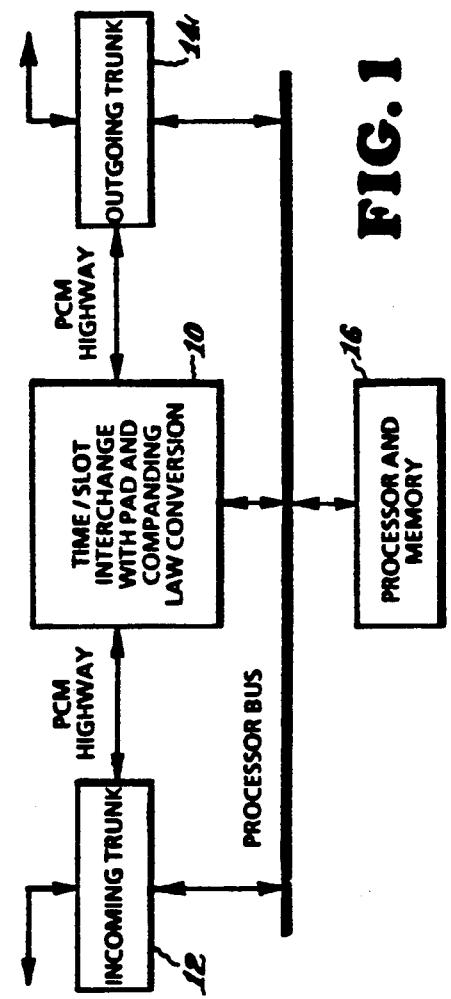
FIG. 1 is a simplified block diagram of a time division multiplex switching system for PCM data messages which embodies the invention.

Referring to FIG. 1 there are shown circuits which are adapted to be connected through PCM highways via a time slot interchange (TSI) 10. These circuits are shown by way of illustration as an incoming trunk 12 and an outgoing trunk 14. The trunks may be of various types depending upon their source, for example T1, CEPT, etc. The trunk circuits 12 and 14 and the time slot interchange 10 are connected via a processor bus to a computer 16 consisting of a processor (a microcomputer chip) and memory. The processor and memory constitute a state machine, various states of which are accessed in accordance with events taking place on the trunks, such as seizures, releases, etc. The system enables a call to come in on one type of trunk, and which has transmission characteristics (encoding into PCM in accordance with one kind of companding law) and signalling in accordance with a particular protocol, to be connected via the time slot interchange (TSI) to a trunk of another type so as to provide two way communications therebetween.

The time slot interchange 10 has pad (insertion loss or attenuation) control and companding law conversion so as to transmit the PCM message data in accordance with the pad and companding law for the receiving or called trunk. Signalling is handled by translation of the signalling messages, including their numbering plans, into a common, protocol independent language (a universal language). This universal language sets up the connection in the TSI 10, and also sets up the pad and companding law converter in the TSI. Thus upon detection of a call and identification of the incoming trunk (or other circuit) and the outgoing trunk (or other trunk), which may be members of trunk (or circuit) groups, signalling messages are generated which set up the routing and the connection in the TSI. Upon release or the end of a call, a new universal message, based upon the events detected on the releasing trunk, is transmitted to the TSI and the associated trunk to complete the call and release the connection.

The time slot interchange and the system used therein for establishing time division multiplex connections (allocating time slots) is, in a presently preferred embodiment of the invention, similar to the TSI described in U.S. Pat. No. 4,228,536 issued Oct. 14, 1980 to K. Gueldenpfennig and C.J. Breidenstein and assigned to Redcom Laboratories, Inc. It includes address registers which receive call routing data. This call routing data is derived from the signalling messages which are transmitted from the incoming trunk circuit. The signalling messages are translated by the processor 16 into universal, protocol-independent messages which address the TSI. These messages also include bits which control the pad and companding law conversion means in the TSI 10. The incoming trunk may operate in accordance with $\mu$-255 law or A-law, while the outgoing trunk operates in accordance with the same conversion law thus no conversion may be necessary (i.e., $\mu$-255 law to $\mu$-255 law which is data transparent or A law to A law which is also data transparent). However, the companding laws may be different and $\mu$-255 law companding used on the incoming trunk may need to be converted to A law companding for decoding of the PCM data messages on the outgoing trunk, or vice versa. The pad values and the companding law conversion as required and as signalled by the universal signalling messages are set up in the TSI 10 in order to accomplish the pad and companding law conversion functions.

The processor 16 operates to determine which circuit of the various types of circuits which are connected to the TSI 10 has dialed in or otherwise requested service. Processor 16 also determines the type of circuit demanding service, thereby identifying the signalling protocol, including numbering plan used in the network containing that circuit type. The identification of the circuit also indicates the companding law and pad value which is being used in that circuit type. The processor invokes the states and calls up the routines necessary to operate the circuits involved in the requested connection in accordance with their unique protocols, while translating the signalling data into the universal, protocol independent language to provide signalling and messages carrying call set up data and other signalling data to the TSI and to the circuit to which the connections are to be made (the outgoing trunk in the case illustrated in FIG. 1).

The circuit type may be identified by its hardware location or port identification code (PID) as discussed in the above-referenced Gueldenpfennig Breidenstein patent. This identification accesses information as to the type of circuit by its screen class. Then the translator is used to respond to dialed digits, thereby developing call treatment data in the form of the universal signalling messages which go to the TSI and the outgoing trunk. At the outgoing trunk, the universal messages are again translated into the protocol in which that circuit type operates. Accordingly, the switching function and the conversions functions are integrated and do not interfere with each other, and the Processing associated with a given type of circuit is not encumbered or complicated by its requiring knowledge of all of the various signalling protocols of the other circuits to which it may be connected. The processing for a given type of circuit need only be concerned with its specific protocol and the universal protocol by means of which it communicates with other circuit types.

The call treatment data defines how to handle the call. One treatment might be to route directly to a specific outgoing circuit. Another treatment may call up a process to wait for dialed digits (expected digits). Based on these digits, another signalling message in the universal language is generated and used to set up the TSI so as to interconnect the outgoing circuit, which is dialed, to the incoming circuit, which has requested the connection thereto. The translation is obtained through the use of a data base (tables) in memory of the processor 16 which are accessed as different events are detected. Different table data from the database is used for the protocol specific connections to operate the circuits (the incoming and outgoing trunks) in accordance with their unique protocols. Other tables are accessed to generate the call treatment data in the form of the universal signalling messages which go to the TSI and which are transmitted between the circuits (effectively) to evoke the unique protocol dependent operations therein.

The processor, therefore, has first control means which are protocol specific and operate the circuits in accordance with their own protocols and second control means which effect the translations and generate the call treatment data in the universal protocol independent language. Information in the call treatment data converts the numbering plans, thereby accommodating different digit prefix counts when outpulsing on the selected circuit. In other words, the signalling messages invoke unique port event processor (PEP) routines specific to the port (e.g. trunk type). The tables in the processor memory constitute a matrix for all states in which the circuits can be placed in response to all events that can occur. The call treatment identifies the events so that circuits having different screen classes can be operated in accordance with a particular sequence using different subroutines, also stored in memory, to carry out the port processes for each different type of circuit, thereby implementing the unique protocol for that circuit. In effect, the incoming trunk is transparent to the outgoing trunk. Both trunks receive the same call treatment data in response to the events and set up the corresponding states through which the PEP is executed.

Figure 2:
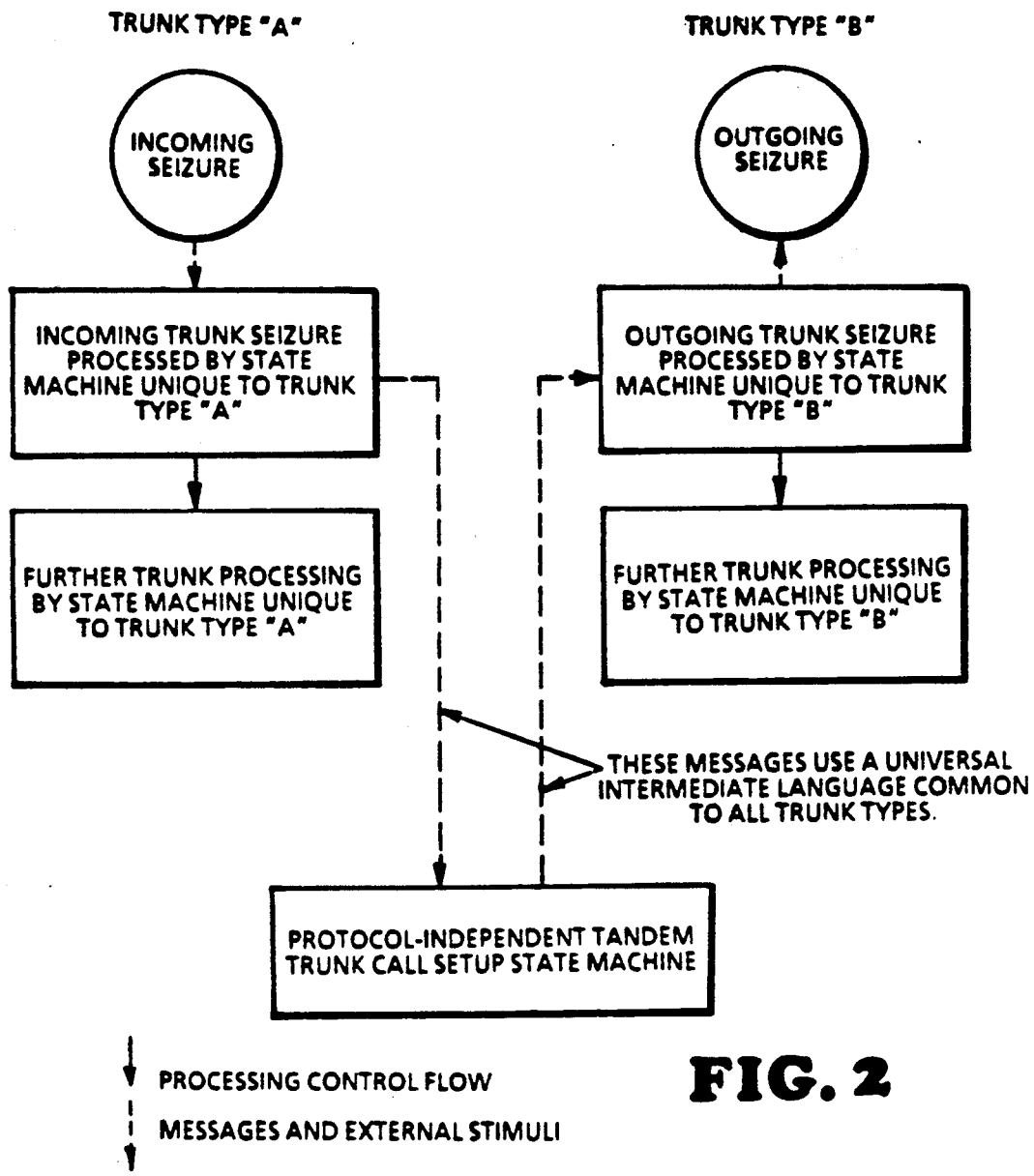
FIG. 2 is a functional block diagram illustrating the operation of the system shown in FIG. 1.

In FIG. 2, a typical call set up in the system shown in FIG. 1 is illustrated. The incoming and outgoing trunks are of different type, namely trunk type "A" and trunk type "B". Each trunk type operates in accordance with its own unique signalling protocol. An incoming seizure is detected. That seizure is processed by a state machine implemented in the processor 16 which is unique to trunk type A. Further trunk processing can be carried out by the state machine as it executes its different states. The state machines constitute the first control means referred to above.

Another set of states executed by the processor translates the signalling messages. This is shown as the protocol independent tandem trunk call set up state machine for the illustrated case where a tandem or transit connection is being made between the type A and the type B trunks. This call set up information is transmitted in the form of call treatment data to the TSI 10 and also to the outgoing trunk, specifically to its unique state machine where the messages processed and any further processes are also carried out by the state machine which is unique to trunk type B. There is, however, transmitted, between these unique state machines or processes, the signalling messages in accordance with the universal (intermediate) language which is common to all trunk types.

Figure 3:
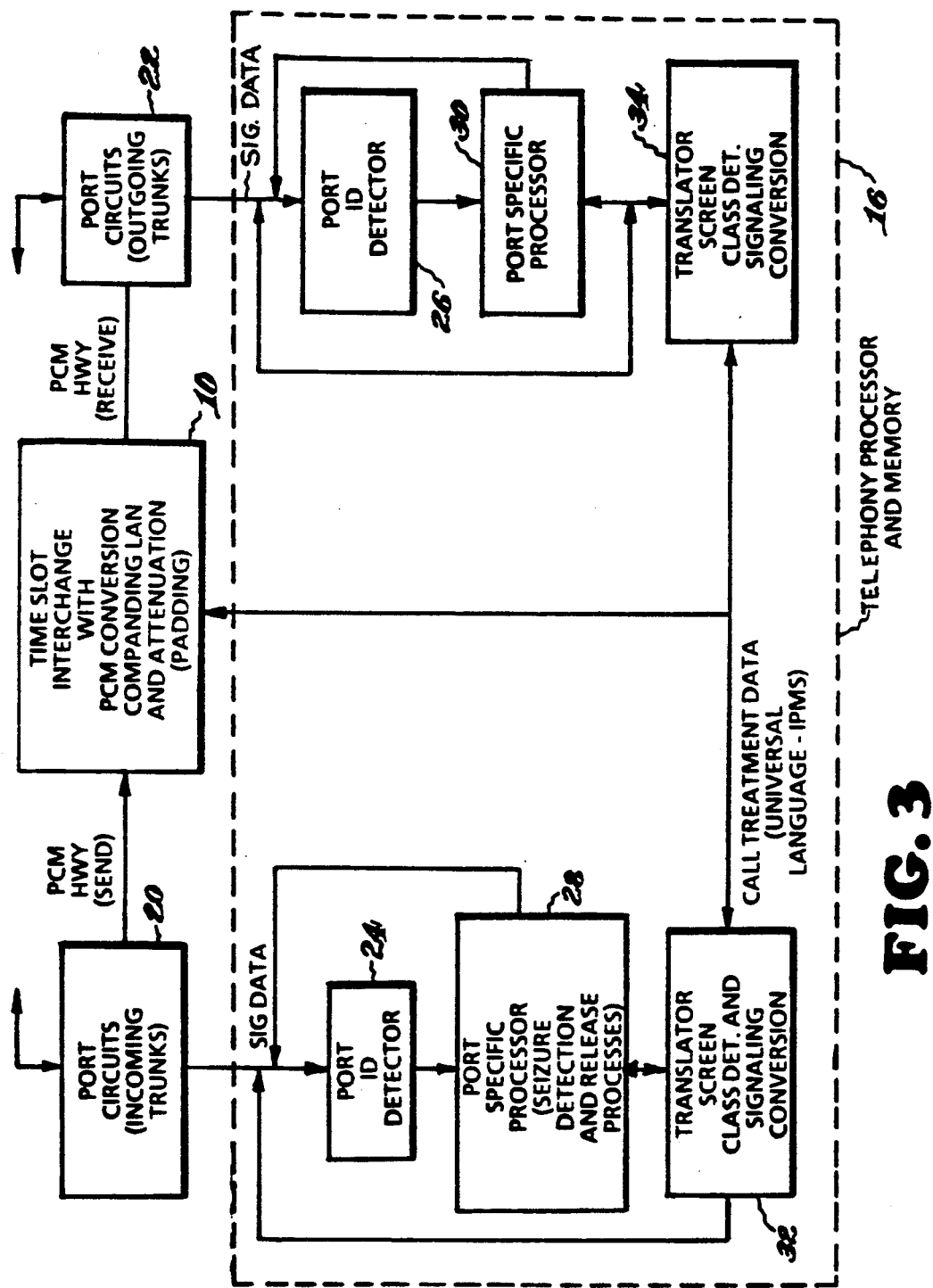
FIG. 3 is a more detailed functional block diagram illustrating the system shown in FIGS. 1 and 2.

Referring to FIG. 3 there is shown two sets of port circuits which are interconnected through the time slot interchange 10 via PCM send and receive highways. The port circuits 20 may be the incoming trunks and the port circuits 22 connected to the receive highway may be the outgoing trunks which are illustrated in FIG. 1. The signalling data (SIGDATA) includes port identification data and is applied to port identification (ID) detectors 24 and 26 for the incoming port circuits 20 and the outgoing port circuits 22 (respectively). The signalling data proceeds to the port specific processor 28 where seizure and release events are detected and processed. A similar port specific processor 30 is associated with the outgoing port circuits 22. The port specific processors are in communication with translators 32 and 34. These translators carry out screen class detection based on the SIGDATA which includes codes identifying the port circuits requiring service or to which connections are made. The translators generate the universal signalling messages in the form of interprocessor messages (IPMS) which are received by the translators and then operate their port specific processors 28 and 30. The call treatment data also sets up the routing between the selected circuits of the port circuits 20 and 22.

Figure 5D:
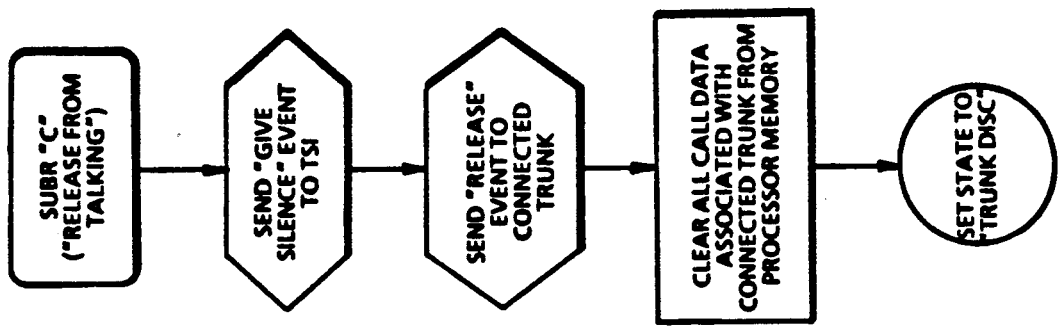
FIG. 5A is a portion of a state transition table and FIGS. 5B-D constitute a flow diagram illustrating the programing of the processor shown in FIGS. 1 and described in connection with FIGS. 2 and 3.
Figure 4:
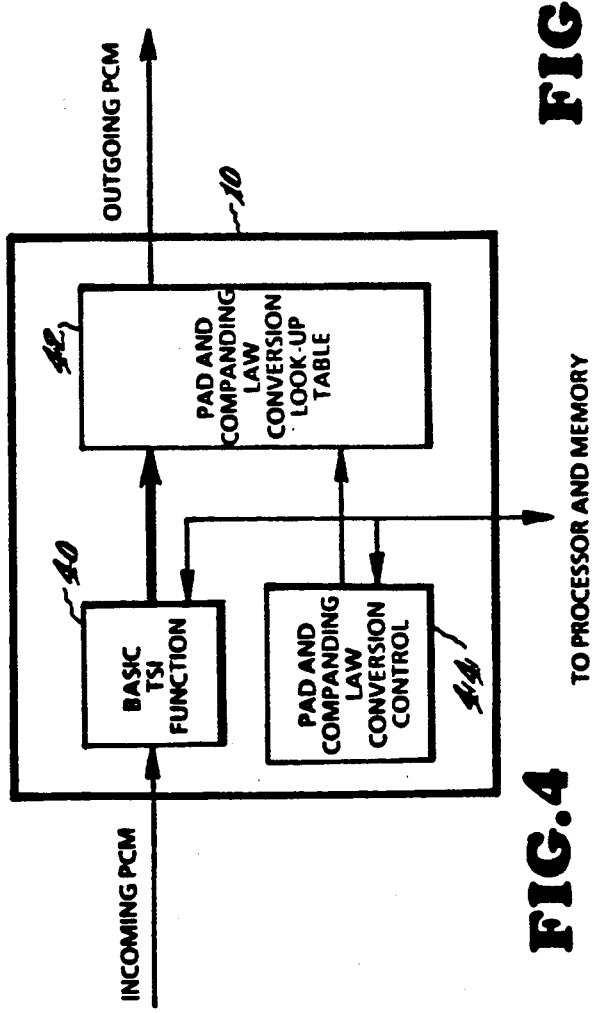
FIG. 4 is a more detailed block diagram of the time slot interchange shown in FIG. 1.

Referring to FIG. 4 there is shown the time slot interchange 10. It includes the apparatus which sets up the routing, namely the RAM which receives the incoming PCM on the send highway and connects it to the receive highway so that the data message is read out in the time slot allocated to the outgoing port. This outgoing PCM, for example, 8 bit bytes, is applied to a post-processor. This post-processor is in the form of memory in the TSI 10 connected to the outgoing or receive highway on which the switching data appears. This memory 42 contains a pad and companding law conversion look up table. The conversion depends upon the 8 bits of the PCM and the signalling message.

The signalling messages are applied to a pad and companding law conversion control 44. This is a register which stores the bits of the signalling message which control the selection of the pad and companding law conversion, for example any of the four or more conversion discussed above, namely A law to A law, $\mu$-255 law to $\mu$-255 law, $\mu$-255 law to A law and A law to $\mu$-255 law. There may be, in addition, eight pad values. The register in the control 44 may also be the TSI address register and therefore is shown connected to the basic TSI function random access memory (RAM) in which the incoming PCM is placed. For four different possible companding law conversions, two bits are required in the signalling message. For eight pad values, three additional bits are required. These five bits and the eight bits of the PCM data address the table 42 and select one of $2^{13}$ different PCM codes in accordance with the pad and companding law conversion which is dictated by the signalling message applied to the conversion control 44 and stored therein.

The system uses serial to parallel conversion to translate the incoming PCM from serial to parallel data. Another parallel to serial conversion is associated with the table memory 42. The code and pad conversion may take two clock periods of the PCM clock. Appropriate delays are used in the signal message transmission paths so as to maintain the proper relationship between the PCM and its associated control signals. Accordingly, the TSI is capable of making the pad and companding law conversions required to reconcile the transmission characteristics of the port circuits which are interconnected through the TSI.

The operation of the system will become more apparent from FIGS. 5A-D.

Figure 5A:
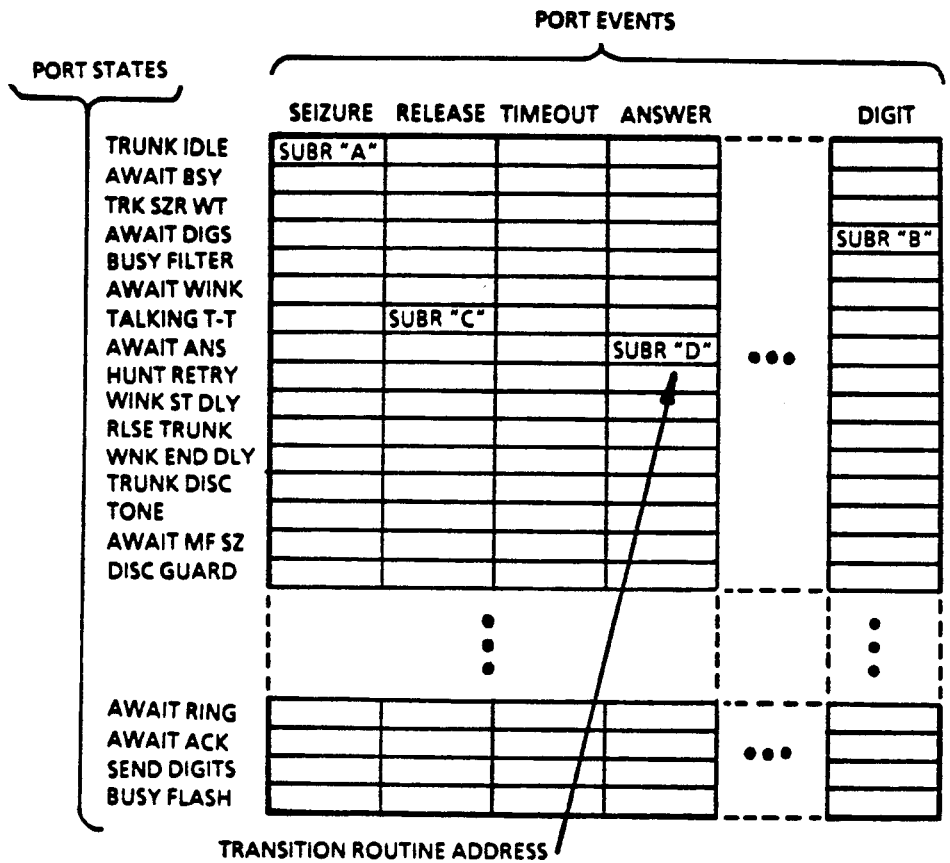

FIG. 5A depicts a portion of a state transition diagram by means of which the first and second control means could be implemented.

Figure 5B:
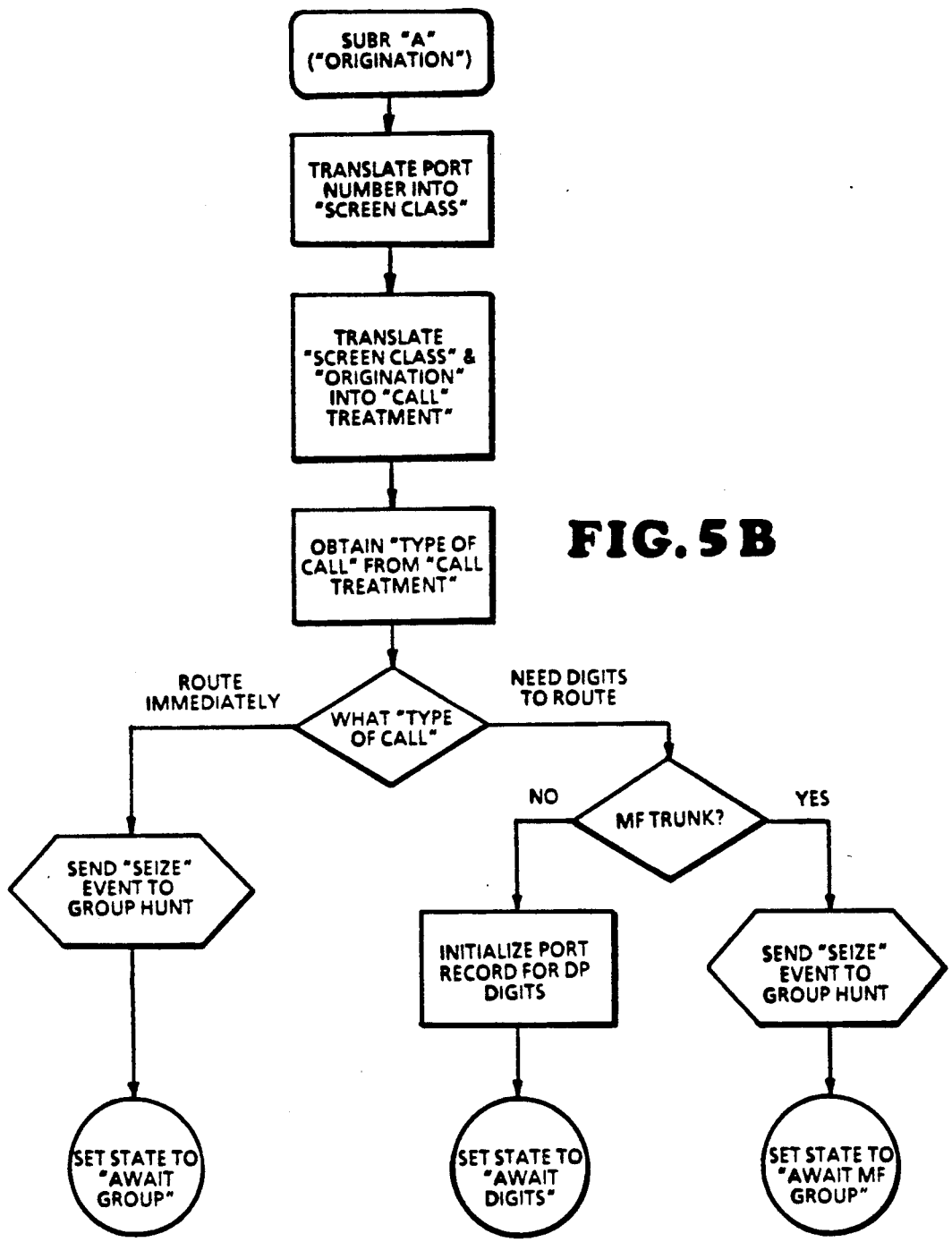
Figure 5C:
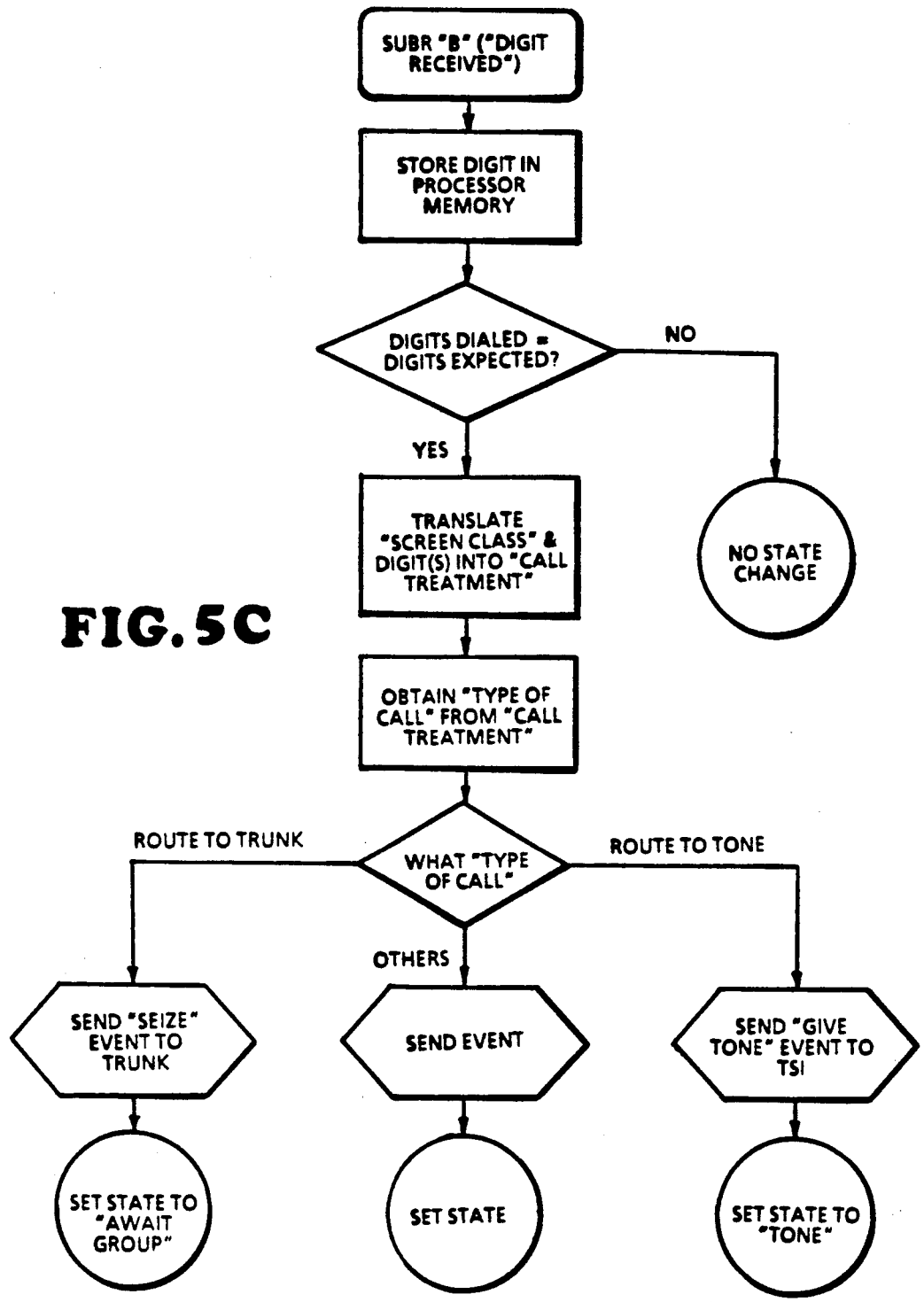

FIGS. 5B, C and D are flow diagrams depicting the processing of three typical transition subroutines shown in the state diagram, specifically SUBR "A", SUBR "B", and SUBR "C".

Inputs to this processing consist of the "Port Events", some of which are given in FIG. 5A (column headers), and the current port state (row headers) which is read out of a processor memory area for the particular port being processed. The "Port Events" consist of two general types, although the processing for both types is the same. The difference between the two types is their origin. One type of "Port Event" arises from external stimuli such as hardware seizure indications or other indications of the external status of the trunk circuit. The other type of "Port Event" is actually an "IPM" (InterProcess Message) resulting from the execution of a transition subroutine invoked by processing of this port or some other port in the system which has an association with this port.

At the intersection of an event (column) with a state (row) in the state transition table stored in processor memory (FIG. 5A) is the address of the transition subroutine responsible for processing this particular event/state combination. The subroutine is then executed. Its execution typically results in a new state being stored in processor memory along with one or more output events. Again, some of these outputs are directed to trunk circuits or the TSI to cause certain hardware actions to be performed, and other outputs become inputs (IPMs) to the same or other ports such as a trunk associated in a call connection, as depicted in FIGS. 5B, C and D.

Certain of the state transition table entries in FIG. 5A and their associated state transition subroutines (similar to those shown in FIGS. 5B, C and D) comprise the first control means which is connected with signalling protocols specific to the trunk type, while the others are of a more general nature and comprise the second control means, in which interactions use a common universal language independent of signalling protocol.

By convention, the subroutines comprising the first control means will contain hardware specific processing and are invoked by the protocol specific events in the table, while the subroutines comprising the second control means communicate to their peers only through the use of a set of IPMs common to that set of subroutines, those IPMs not being used by the first control means. In this way the latter set of IPMs comprise a universal language, and the first control means is thereby relieved of the requirement to possess knowledge of the details of signalling protocols of all the various trunk types to which a given trunk may be connected. Adding a new signalling protocol is thus greatly simplified; in that a state process is used for the protocol using the conventions of the first control means (specific to that protocol) and interfacing to the peer processes of this and other trunk types using conventions of the second control means involving IPMs of the universal language.

From the foregoing description it will be apparent that there has been provided an improved time division multiplex system which provides a gateway for interconnecting circuits, such as trunks, originating in telecommunication networks having different signalling, transmission and insertion loss protocols and formats. Variations and modifications in the herein described system, within the scope of the invention, will undoubtedly suggest themselves to those skilled in the art. Accordingly the foregoing description should be taken as illustrative and not in a limiting sense.

We claim:

1. A time division switching system for providing communications between circuits which operate with signalling data signals formatted according to any of the plurality of different signalling protocols and which circuits are connected to highways over which message data is transmitted, said system comprising time slot interchange means connected to said highways for providing time division multiplexed connections for said message data, first control means responsive to said signalling data signals for controlling said circuits in accordance with the signalling protocol in which said data is handled by said circuits, and second control means also response to said signalling data signals for translating said signalling data irrespective of the signalling protocol thereof being any of said plurality of different signalling protocols into signalling messages in accordance with a protocol common to said circuits for establishing with said common protocol message said time division multiplex connections in said time slot interchange means and for carrying signalling data between said first control means, and wherein said data messages can be transmitted and received by said circuits in different PCM codes representing said messages in accordance with different companding laws or attenuation characteristics, said time slot interchange means having code conversion means for converting messages switched between said circuits into the PCM code for the respective ones of said circuits, and means for controlling said conversion means with said messages from said translating means for providing code conversions between codes for said circuits between which said data messages are switched by said time slot interchange means.

2. A time division switching system for providing communications between circuits which operate with signalling data signals formatted according to any of the plurality of different signalling protocols and which circuits are connected to highways over which message data is transmitted, said system comprising time slot interchange means connected to said highways for providing time division multiplexed connections for said message data, first control means responsive to said signalling data signals for controlling said circuits in accordance with the signalling protocol in which said data is handled by said circuits, and second control means also response to said signalling data signals for translating said signalling data irrespective of the signalling protocol thereof being any of said plurality of different signalling protocols into signalling messages in accordance with a protocol common to said circuits for establishing with said common protocol message said time division multiplex connections in said time slot interchange means and for carrying signalling data between said first control means, and wherein said first control means includes means responsive to the type of said circuit for identifying said circuit which is to be connected through said time slot interchange means, said first control means including means for first processing of said signalling data signals in accordance with different protocols corresponding to a plurality of different types of said circuits, means for invoking said processing means which processes said signalling data in accordance with the type of said circuit which is identified by said type responsive means, said translating means including means for second processing of said signalling data in response to the type of circuit identified by said type responsive means to produce said signalling messages in said common protocol.

3. The system according to claim 2, wherein said first and second processing means are provided by a computer having a data processor and memory, said memory having stored therein a data base containing a plurality of routines, and means for accessing said routines in accordance with said signalling data signals and with the type identification of said circuits having said message data connections therebetween.

4. The system according to claim 1 wherein said time slot interchange means comprises means for switching said data message between said incoming and outgoing ones of said highways, in time slots represented by said signalling messages, and said conversion means is connected along said outgoing highway for said data messages which are switched to said outgoing highway, and said conversion means having inputs for said data messages and for said signalling messages and outputs for said data messages.

5. The system according to claim 4 wherein said converting means comprises means responsive to said signalling messages for selecting different output data messages corresponding to said data messages applied to said inputs thereof.

6. The system according to claim 5 wherein said conversion means includes means providing a look up table containing said output data messages, and said selecting means including means responsive to said data messages and said signalling messages applied to the inputs of said conversion means for addressing said look up table.

* * * * *